US00RE47416E

(19) United States
(12) Reissued Patent
Lee

(10) Patent Number: US RE47,416 E
(45) Date of Reissued Patent: Jun. 4, 2019

(54) CUTTING MACHINE FOR WINDOW COVERINGS

(71) Applicant: NIEN MADE ENTERPRISE CO., LTD., Taichung (TW)

(72) Inventor: Wen-Yeu Lee, Tainan (TW)

(73) Assignee: NIEN MADE ENTERPRISE CO., LTD., Taichung (TW)

(21) Appl. No.: 15/638,077

(22) Filed: Jun. 29, 2017

Related U.S. Patent Documents

Reissue of:
(64) Patent No.: 9,068,393
Issued: Jun. 30, 2015
Appl. No.: 13/852,339
Filed: Mar. 28, 2013

(51) Int. Cl.
*E06B 9/66* (2006.01)
*E06B 9/266* (2006.01)
*B26D 7/02* (2006.01)

(52) U.S. Cl.
CPC ..... *E06B 9/66* (2013.01); *E06B 9/266* (2013.01); *Y10T 83/7487* (2015.04)

(58) Field of Classification Search
CPC ..... E06B 9/66; E06B 9/266; Y10T 83/7487
USPC ..... 83/629, 452, 200, 444, 788, 453, 790, 83/469.1, 802, 522.19, 468, 523, 454, 83/635, 923, 466.1, 468.4, 468.8, 468.93, 83/468.94, 563, 565.821, 633, 634
See application file for complete search history.

(56) References Cited

U.S. PATENT DOCUMENTS 5,927,172 A * 7/1999 Wang ..... B23D 23/00 83/454
6,079,306 A * 6/2000 Liu ..... B23D 23/00 83/167
6,240,824 B1 * 6/2001 Hsu ..... B23D 23/00 29/24.5
6,681,673 B1 1/2004 Kutchmarek et al. ..... B23D 23/00 83/468
6,761,099 B2 7/2004 Lin et al. ..... B23D 23/00 29/24.5
2001/0054338 A1 * 12/2001 Marocco ..... B23D 23/00 83/13
2004/0112194 A1 * 6/2004 Lin ..... B26D 7/025 83/452
2005/0150344 A1 * 7/2005 Nien et al. ..... B26D 5/08 83/651
2005/0188801 A1 * 9/2005 Marocco ..... B23D 23/00 83/13
2009/0078101 A1 * 3/2009 Nien et al. ..... B23D 23/00 83/468
2010/0089217 A1 * 4/2010 Cheng ..... B23D 23/00 83/631

(Continued)

*Primary Examiner* — William C Doerrler

(74) *Attorney, Agent, or Firm* — Lynette Wylie; Apex Juris, pllc.

(57) ABSTRACT

A cutting machine for cutting components of window coverings has a machine base, a first cutting unit, a first restricting unit, a second cutting unit, and a second restricting unit. The first cutting unit and the second cutting unit are provided on the machine base. The first cutting unit is designed to cut a horizontal top rail, a horizontal bottom rail and horizontal slats of a venetian blind, and a vertical top rail of a vertical blind; the second cutting unit is designed to cut vertical slats of the vertical blind. The first and the second restricting units are designed to hold the components to be cut at specified positions by the first and the second cutting units.

20 Claims, 9 Drawing Sheets

(56) References Cited

U.S. PATENT DOCUMENTS

2010/0313726 A1* 12/2010 Lee ..... B23D 23/00
83/200

* cited by examiner

CUTTING MACHINE FOR WINDOW COVERINGS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates generally to a window covering, and more particularly to a cutting machine for window coverings.

2. Description of the Related Art

Typically, there are two types of window blinds, which are venetian blinds and vertical blinds. In the present days, a consumer can buy window blinds in a store, and the window blinds are cut right in the store to meet the demand of the consumer.

The conventional venetian blind has several components, typically including a top rail, a bottom rail, and slats. Each component may have specified size and material. For example, the top rail and the bottom rail usually are made of strong metal, and the slats are made of light materials, like aluminum or PVC. It is obvious that these components shouldn't be cut by the same cutter due to different properties of different materials. However, the common cutting machine in the market only has one cutter, and such cutting machines are taught in U.S. Pat. Nos. 6,761,099 and 6,681,673.

An improved cutting machine is provided with various cutters for different components of window blinds. Such cutting machine has two or more motors to drive the cutters respectively. But such cutting machines are complex and expensive.

Furthermore, all the conventional cutting machines as mentioned above can only cut one type of window blinds, which is not efficient.

SUMMARY OF THE INVENTION

The primary objective of the present invention is to provide a cutting machine for window coverings, which may cut two or more types of window blinds. It has a simple structure and is easy to operate.

According to the objective of the present invention, the components of the window coverings include a horizontal top rail, a horizontal bottom rail and horizontal slats of a venetian blind, and a vertical top rail and vertical slats of a vertical blind, and a cutting machine for cutting the components of window coverings includes a machine base for the components, a first cutting unit and a second cutting unit; the machine base is a substantially elongated member, which has a long axis and a short axis, wherein the machine has a first side and an opposite second side along the long axis, and has a third side and an opposite fourth side along the short axis; the first cutting unit is provided on the machine base and adjacent to the first side, including a base, a slat holding device, a cutter device, and a driving device; the base has a first bore and a first positioning bore to receive the horizontal slats and the horizontal top rail respectively; the slat holding device has a pressing block and a pushing member, wherein the pressing block is movably received in the first bore of the base and has a bore to receive the horizontal bottom rail; the pushing member moves the pressing block toward the first positioning bore; the cutter device is movably provided on the base, which has a first cutter and a second cutter which are adjacent to the first bore and the first positioning bore respectively, and the first cutter is used to cut off the horizontal slats and the horizontal bottom rail, the second cutter is used to cut off the horizontal top rail; and the driving device has a connecting member and an operating member, wherein the connecting member is connected to the cutter device, and the operating member is connected to the connecting member to move the cutter device; the second cutting unit is movably mounted on the machine base, which comprises a frame, a cutter, and a controller; the frame is movably provided on the machine base for a movement along the long axis of the machine base; the cutter is movably provided in the frame, wherein a second bore is formed between the cutter and the frame to receive the vertical slats; and the controller is connected to the cutter to move the cutter; wherein the frame has a movable base and two rails; the movable base is movably mounted on the machine base, and the rails are connected to the movable base; the rails are vertical to the movable base and are parallel to the short axis of the machine base; the cutter is provided between the rails with opposite sides engaging the rails; and the controller moves the cutter to move in the rail to cut the vertical slats off.

In an embodiment, the pushing member of the slat holding device of the first cutting unit has a block, a shaft, and a flexible member; the block is connected to the connecting member; the block has a opening, and the base has an opening; the shaft passes through the opening of the block and the opening of the base to connect to the pressing block; the flexible member is provided on the shaft and is between the block and the base to move the pressing block.

In an embodiment, the shaft has a protrusion at a side adjacent to the pressing block; the protrusion is outside of the base; and the flexible member is between the protrusion and the block.

In an embodiment, the second cutting unit's cutter is provided with a slot parallel to the short axis of the machine base; and the controller includes a sliding block, a linkage, and a control bar; the sliding block is received in the slot of the cutter to move in the slot; the linkage is pivoted on the sliding block; and the control bar is pivoted on the frame and engages the linkage, whereby when the control bar is moved, the cutter is moved via the linkage and the sliding block.

In an embodiment, the cutting machine further comprises a second restricting unit which has a fixing base and a restricting board; the fixing base is connected to the second side of the machine base, and the restricting board is movably provided on the fixing base to move along the long axis of the machine base.

In an embodiment, the cutting machine further comprising a first restricting unit provided on the machine base, wherein the first restricting unit is closer to the first side than the first cutting unit; the first restricting unit has a stop device, a transmitting device, and a fixing device; the stop device is beside the first cutting unit; the transmitting device is connected to the stop device and the driving device; when the driving device moves the cutter along the short axis of the machine base, the driving device moves the stop device between a first position and a second position, wherein the first position is closer to the cutter device than the second position; at the first position, the stop device rests against ends of the horizontal bottom rail and the horizontal slats in the first bore and the horizontal top rail in the first positioning bore; the fixing device is connected to the machine base; the transmitting device rests against the stop device when the stop device is on the first position, and the transmitting device leaves the stop device when the stop device moves toward the second position from the first position.

In an embodiment, the transmitting device has a transmitting board, a transmitting shaft, a first supporting shaft, a second supporting shaft, and a locking member; the transmitting board is pivoted on the machine base through an axle; the transmitting board has a slot; the transmitting shaft has an end connected to the connecting member of the driving device to move with the cutter device; the transmitting shaft has a post on an opposite end to engage the slot of the transmitting board; the first supporting shaft has an end fixed to the machine base and an opposite end engaging and passing through the stop device, whereby the stop device is free to move between the first position and the second position relative to the first supporting shaft; the second supporting shaft has an end engaging the base and an opposite end pivoted on the transmitting board; the locking member is connected to the second supporting shaft; the locking member is provided with a scale to secure the stop device at a specific position on the second supporting shaft; when the driving device moves the cutter device and the transmitting shaft, the post moves in the slot to swing the transmitting board which will move the second supporting shaft in a direction away from the base, as a result, the stop device is moved in a direction away from the first bore and the first positioning bore.

In an embodiment, the transmitting board of the transmitting device is closer to the first cutting unit than the fixing device of the first restricting member to be move to rest against or leave the fixing device.

In an embodiment, the connecting member of the driving device is a rack; the rack has teeth meshed with a gear set; and the gear set is connected to the operating member.

In an embodiment, the base is further provided with a second positioning bore adjacent to the first positioning bore to receive the vertical top rail; the first bore, the first positioning bore and the second positioning bore are located in order along the short axis of the machine base; the cutter device further has a third cutter beside the second positioning bore to cut the vertical top rail.

Therefore, the aforementioned cutting machine for window coverings has a simple structure, and is easy to operate. Moreover, it has the ability to cut components of different types of window blinds.

DETAILED DESCRIPTION OF THE INVENTION

Figure 1:
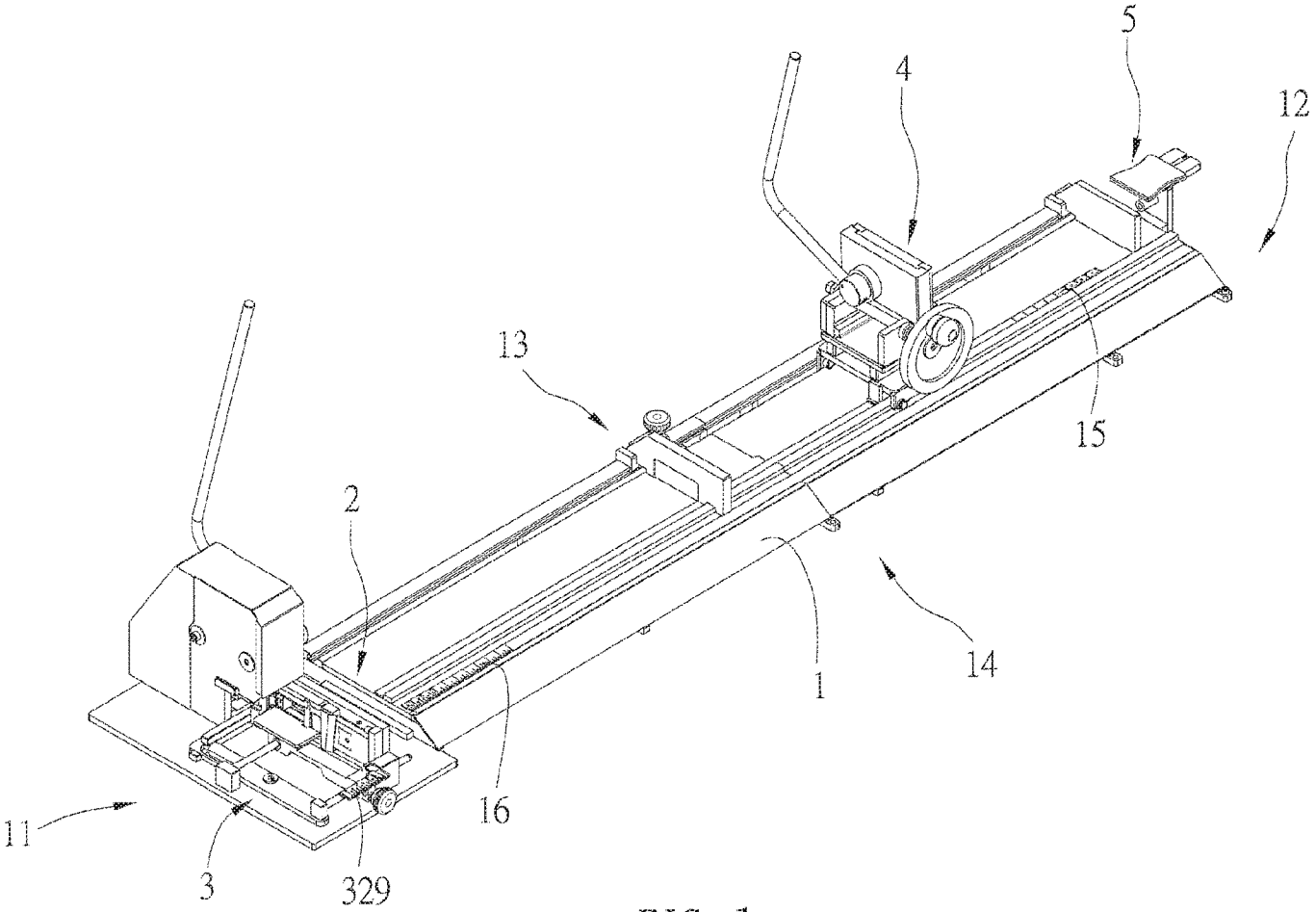
FIG. 1 is a perspective view of a preferred embodiment of the present invention.

FIG. 1 shows a cutting machine of the preferred embodiment of the present embodiment, which is designed for cutting components of venetian blinds, vertical blinds, and any other types of window blinds. The venetian blind has a horizontal top rail, a horizontal bottom rail, and a plurality of horizontal slats. The vertical blind has a vertical top rail and a plurality of vertical slats. The size and structure of these components of the window blinds are well known for a person who is skilled in the art, so we do not describe the relating details here. As shown in FIG. 1, the cutting machine has a machine base 1, a first cutting unit 2, a first restricting unit 3, a second cutting unit 4, and a second restricting unit 5.

The machine base 1 is a substantially elongated rectangular member. The components of the window blinds are put on the machine base 1 parallel to a long axis of the machine base 1, and are movable along the long axis. The machine base 1 has a first side 11 and a second side 12 at the opposite sides of the long axis, and has a third side 13 and a fourth side at the opposite sides of a short axis which is vertical to the long axis. The machine base 1 is provided with a first scale 15 and a second scale 16 on a top side thereof. The first scale 15 is located adjacent to the second side 12, and the second scale 16 is adjacent to the first side 11.

Figure 2:
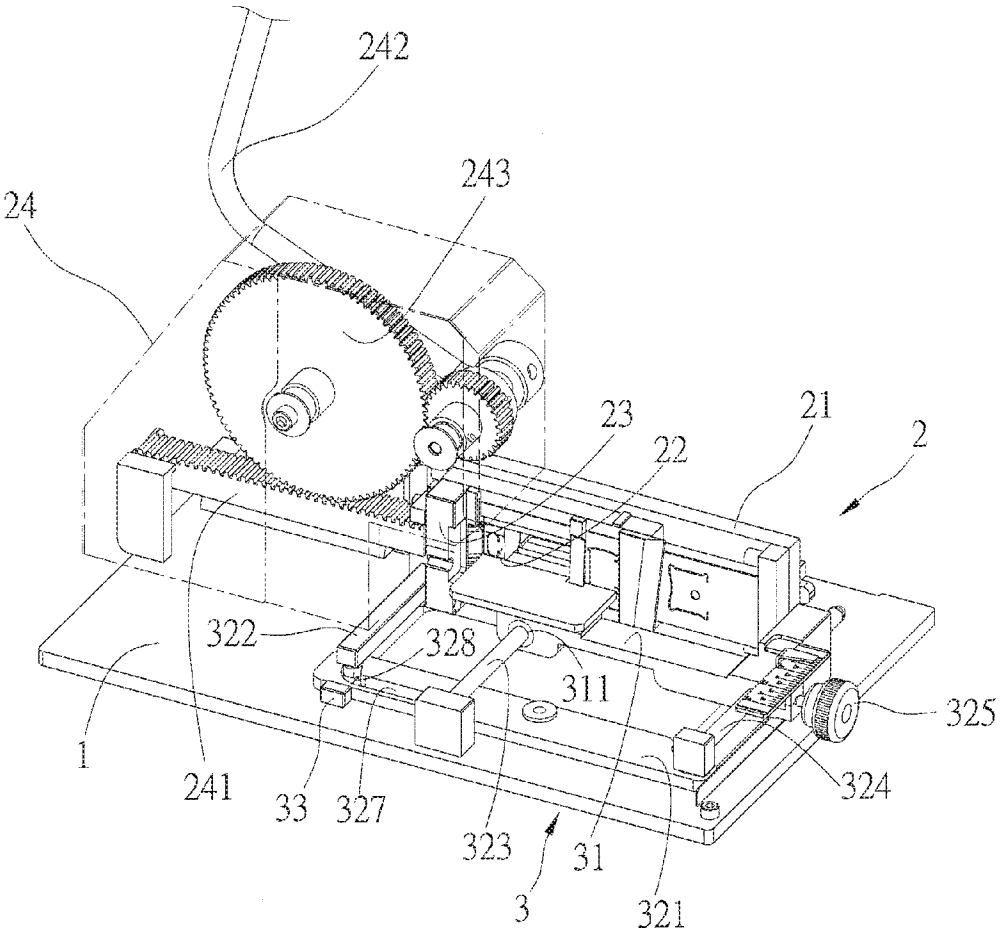
FIG. 2 is a perspective view of the preferred embodiment of the present invention, showing the first cutting unit and the first restricting unit.
Figure 3:
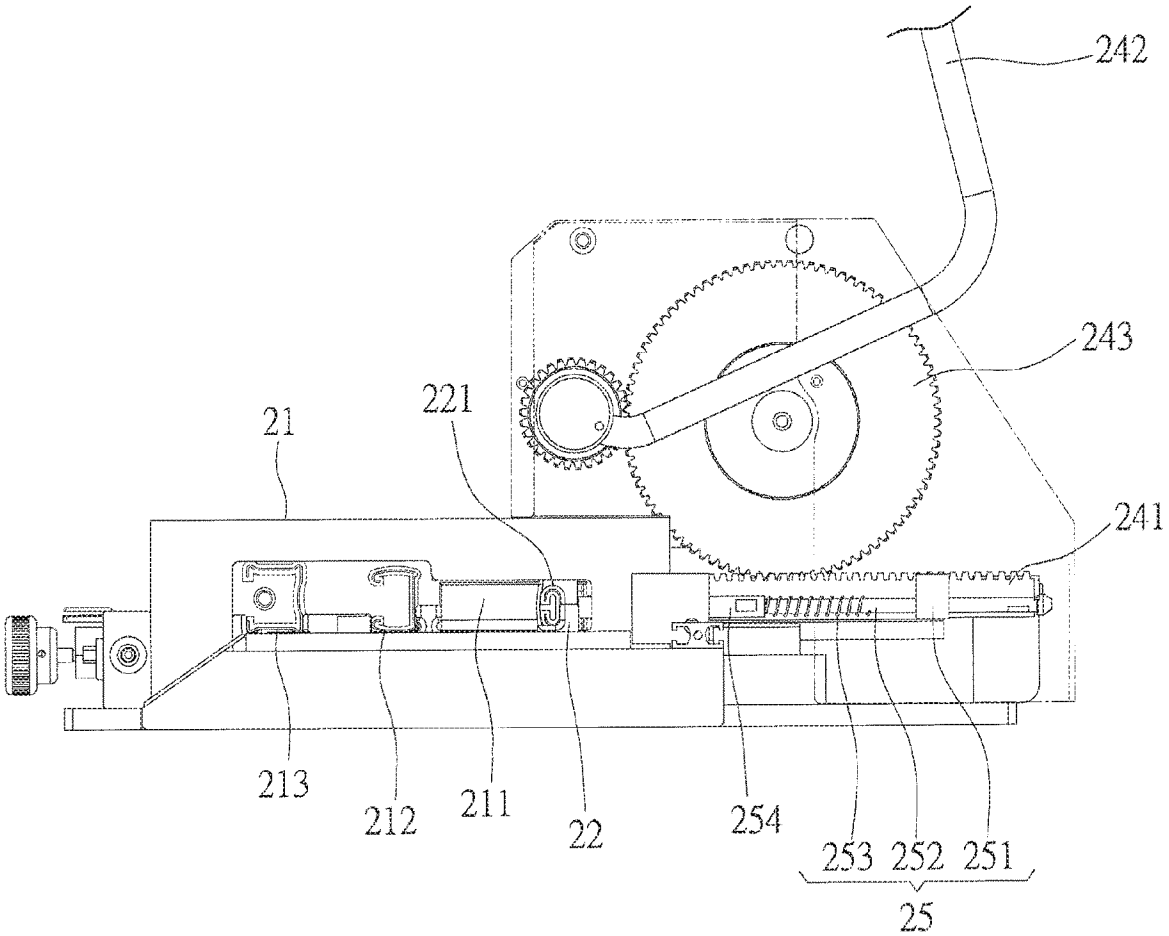
FIG. 3 is a rear view of FIG. 2.
Figure 4:
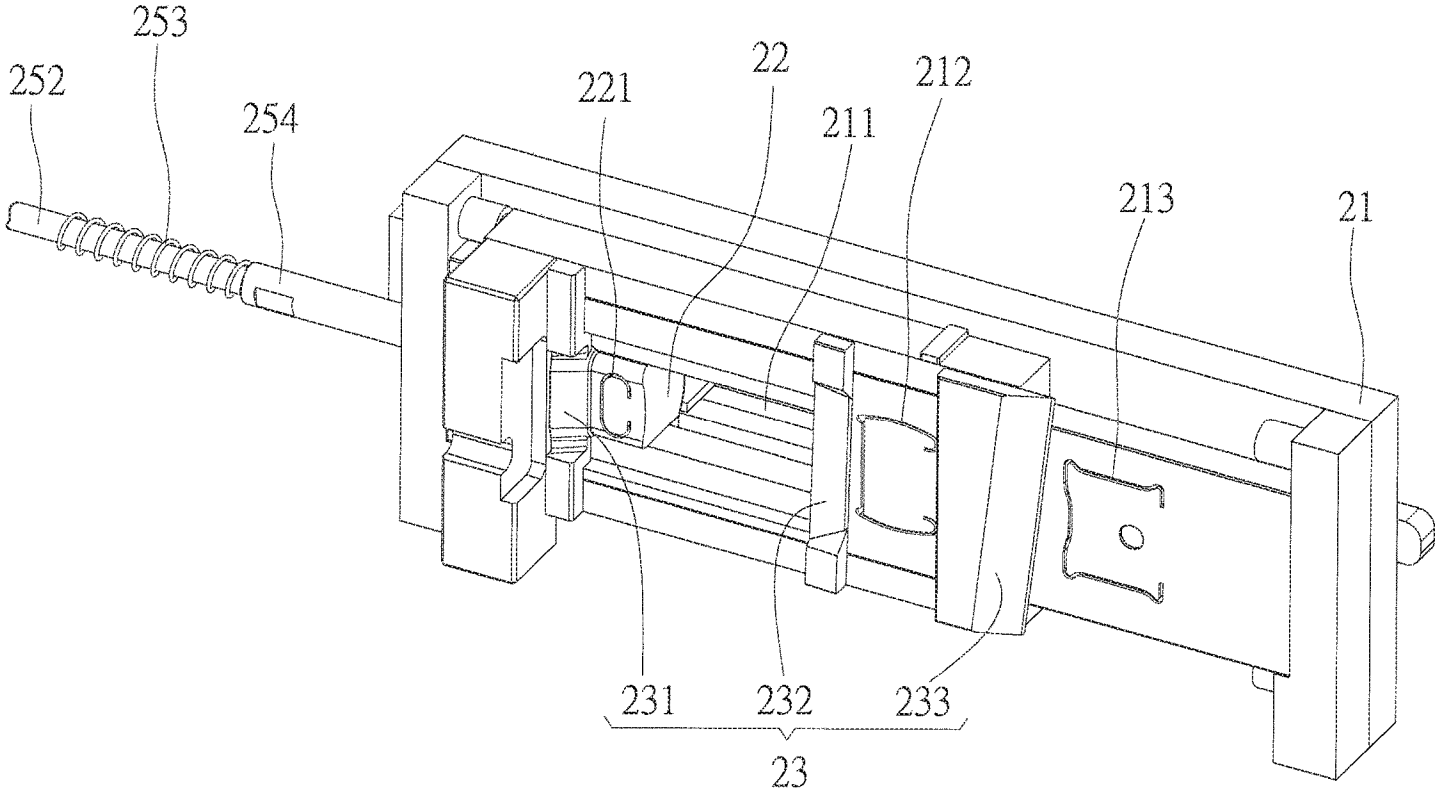
FIG. 4 is a perspective view of the preferred embodiment of the present invention, showing the base and the cutter device.

As shown in FIG. 2 to FIG. 4, the first cutting unit 2 is designed for cutting the horizontal top rails, the horizontal bottom rails, the horizontal slats of the venetian blinds, and the vertical top rails of the vertical blinds. The first cutting unit 2 is provided on the machine base 1 and is adjacent to the first side 11. The first cutting unit 2 has a base 21, a cutter device 23, a driving device 24, and a slat holding device.

The base 21 is provided on the machine base 1, and has a first bore 211, a first positioning bore 212, and a second positioning bore 213 located in order from the third side 12 to the fourth side 14. The horizontal slats, the horizontal top rail and the vertical top rail may respectively engage the first bore 211, the first positioning bore 212, and the second positioning bore 213. The first positioning bore 212 and second positioning bore 213 respectively have a specified shape which fits cross sections of the horizontal top rail and the vertical top rail.

The cutter device 23 is provided on the base 21, and is able to move along the short axis of the machine base 1. The cutter device 23 has a first cutter 231, a second cutter 232, and a third cutter 233, which are in association with the first bore 211, the first positioning bore 212, and the second positioning bore 213 respectively.

The driving device 24 is provided on the machine base 1, which has a connecting member 241 and an operating member. The connecting member 241 is connected to the cutter device 23, and is controlled by the operating member to move along the short axis of the machine base 1. In this embodiment, the connecting member 241 is a toothed rack parallel to the short axis of the machine base 1, and the operating member has a handle 242 and a gear set 243. The gear set 243 is meshed with the rack 241, and is connected to the handle 242. Therefore, turning the handle 242 may rotate the gear set 243, and then move the rack 241, as well as the cutter device 23.

The slat holding device is provided on the machine base 1, which has a pressing block 22 and a pushing member 25. The pressing block 22 is received in the first bore 211 and is adjacent to the third side 13. The pressing block 22 is able to move along the short axis of the machine base 1 within the first bore 211. The pressing block 22 has a bore 221 to engage the horizontal bottom rail, and the shape of the bore 221 fits the cross section of the horizontal bottom rail. The pushing member 25 has a block 251, a shaft 252, and a flexible member 253. The block 251 is provided on the connecting member 241. The block 251 has an opening (not shown). The shaft 252 is inserted into the opening of block 251 and an opening (not shown) on the base 21, and then the shaft 252 is connected to the pressing block 22 in the first bore 211. The shaft 252 has a protrusion 254 at a side adjacent to the pressing block 22, and the protrusion 254 is outside of the base 21. The flexible member 253 is a spring in the present embodiment. The spring 253 fits the shaft 252, and is located between the protrusion 254 and the block 251 to push the block toward the fourth side 14 through the shaft 252.

As shown in FIG. 1, FIG. 2, FIG. 5, and FIG. 6, the first restricting unit 3 is provided on the machine base 1. The first cutting unit 2 is closer to the second side 12 than the first restricting unit 3. The first restricting unit 3 includes a stop device 31, a transmitting device 32, and a fixing device 33.

The stop device 31 is a substantially elongated plate on a side of the base 21 where corresponding to the first bore 211, the first positioning bore 212 and the second positioning bore 213. The stop device 31 is closer to the first side 11 than the base 21. The stop device 31 has a slot 311 on a bottom side thereof. The slot 311 is an elongated slot parallel to the long axis of the machine base 1.

The transmitting device 32 is connected to the stop device 31 and the driving device 24 to move the stop device 31 between a first position (FIG. 5) and a second position (FIG. 6) while the driving device 24 is moving the cutter device 23. The first position is closer to the cutter device 23 than the second position. The transmitting device 32 has a transmitting board 321, a transmitting shaft 322, a first supporting shaft 323, a second supporting shaft 324, and a locking member 325. The transmitting board 321 is an elongated board pivoted on the machine base 1 through an axle 326. The transmitting board 321 has a slot 327. The transmitting shaft 322 has an end connected to the connecting member 241 of the driving device 24 to move with the cutter device 23, and the other end of the transmitting shaft 322 is provided with a post 328. The post 328 engages the slot 327 of the transmitting board 321. The first supporting shaft 323 has an end fixed to the machine base 1 and the other end engaging the slot 311 of the stop device 31. The stop device 31 is able to move on the supporting shaft 323 between the first position and the second position. The second supporting shaft 324 has an end passing through the base 21 and the other end pivoted on the transmitting board 321. The second supporting shaft 324 is pivoted on a side of the transmitting board 321, which is opposite to the slot 327. The second supporting shaft 324 is able to move along the long axis of the machine base 1 relative to the base 21. The stop device 31 is fixed onto the second supporting shaft 324 at a predetermined position by the locking member 325.

Figure 5:
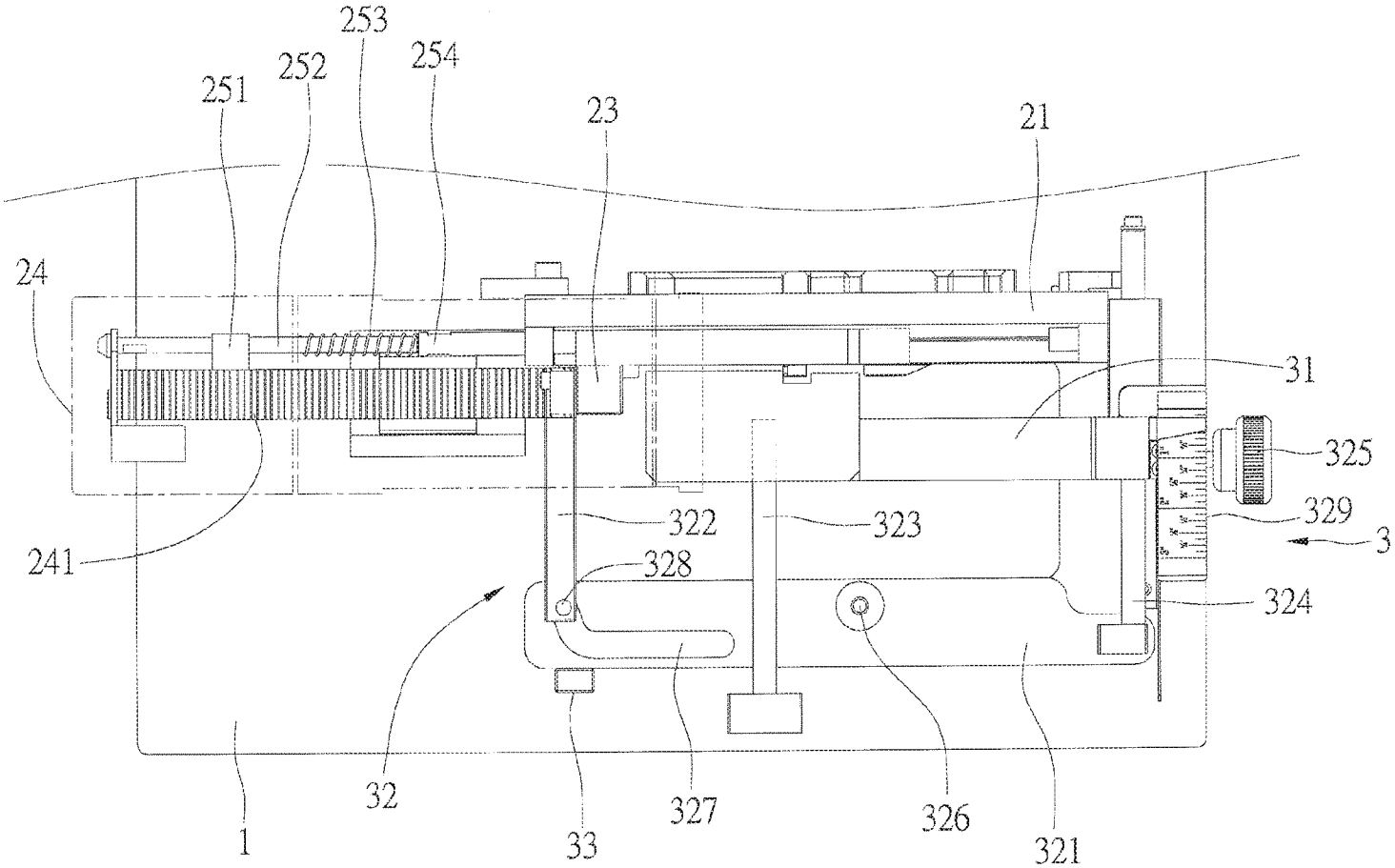
FIG. 5 is a top view of the preferred embodiment of the present invention, showing the stop device of the first restricting unit in the first position.
Figure 6:
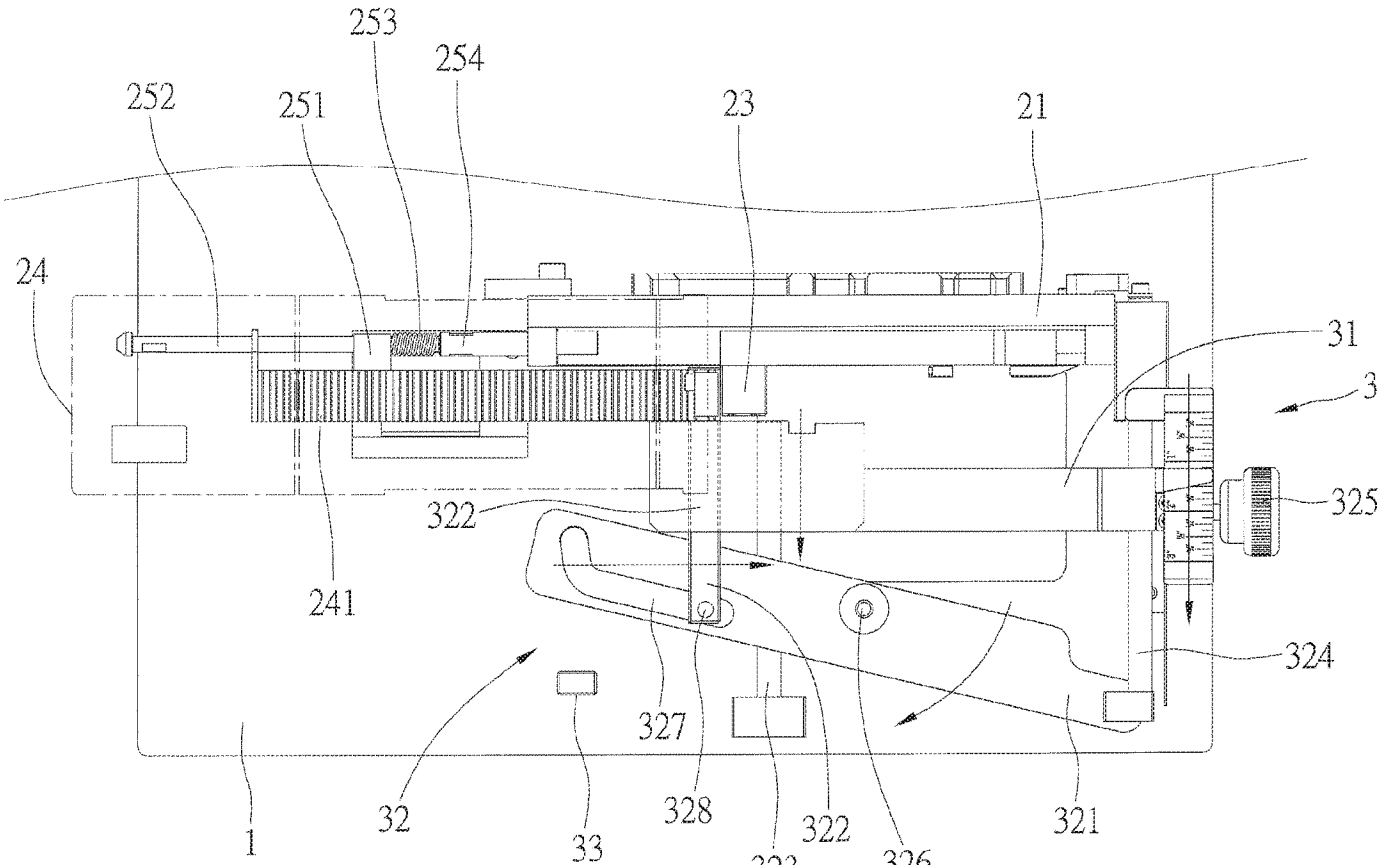
FIG. 6 is a top view of the preferred embodiment of the present invention, showing the stop device of the first restricting unit in the second position.

The fixing device 33 is a cube in the present embodiment. The fixing device 33 is fixed to the machine base 1, and is adjacent to the transmitting board 321. The transmitting board 321 is closer to the first cutting unit 2 than the fixing device 33. The transmitting board 321 touches the fixing device 33 when the stop device 31 is moved to the first position (FIG. 5), and the transmitting board 321 leaves the fixing device 33 when the stop device 31 is moved toward the second position (FIG. 6). The locking member 325 has a third scale 329.

When a user wants to cut the horizontal slats, the horizontal top rail and the horizontal bottom rail of a venetian blind with the cutting machine of the present invention, the user has to adjust the location of the stop device 31 using the third scale 329 of the locking member 325, and then lock the locking member 325 to secure the stop device 31 at a specified position on the second supporting shaft 324. At this time, the stop device 31 is at the first position, as shown in FIG. 5. Next, the user has to put the components of the venetian blind in the bores 211, 212, 221 (specifically, the horizontal slats for the first bore 211, the horizontal top rail for the first positioning bore 212, and the horizontal bottom rail for the bore 221), and push them toward the first side 11 until they touch the stop device 31. If the user wants to cut the vertical top rail of a vertical blind, he/she has to put the rail in the second positioning bore 213 and adjust a location of the vertical top rail with the second scale 16.

Next, the user operates the handle 242 to move the cutter device 23 toward the fourth side 14. As a result, the cutters 231-233 will cut the components off respectively.

As shown in FIG. 5 and FIG. 6, the transmitting shaft 322 moves with the driving device 24, so that it will move the post 328 along the slot 327 and the transmitting board 321 at the same time. As a result, the second supporting shaft 324 is moved in a direction away from the base 21. The stop device 31, which moves with the second supporting shaft 324, is moved to the second position from the first position. As a result, it is easy to remove the waste material after cutting from the first cutting unit 2.

The top and bottom rails of the blinds usually are bent plates, and the rails all have a transverse middle section and two vertical side sections at opposite ends of the middle section. The bores 212, 213, 221 are shaped respectively to fit the rails, and they have a middle portion for fitting the middle section of the rails, and two side portions for fitting the side sections. The middle portions of the bores 212, 213, 221 are closer to the corresponding cutters 231-233 than the side portions. In other words, the middle section of the rails will be first portion to be cut when the cutters 231-233 are used to cut the rails.

When the user put horizontal slats in the first bore 211, he/she may operate the handle 242 to move the pressing block 22 via the connecting member 241, the block 251, the flexible member 253, the protrusion 254, and the shaft 252, so that the pressing block 22 presses the slats to hold them. The flexible member 253 cushions the pressure on the slats to avoid making indents on the slats.

While the stop device 31 is at the first position, and the rails or slats are put in the corresponding bores, the transmitting board 321 is rested against the fixing device 33 to avoid the transmitting device 32 and the stop device 31 from being moved by the rails or slats. It will firmly secure the stop device 31 to increase the accuracy in cutting.

Figure 7:
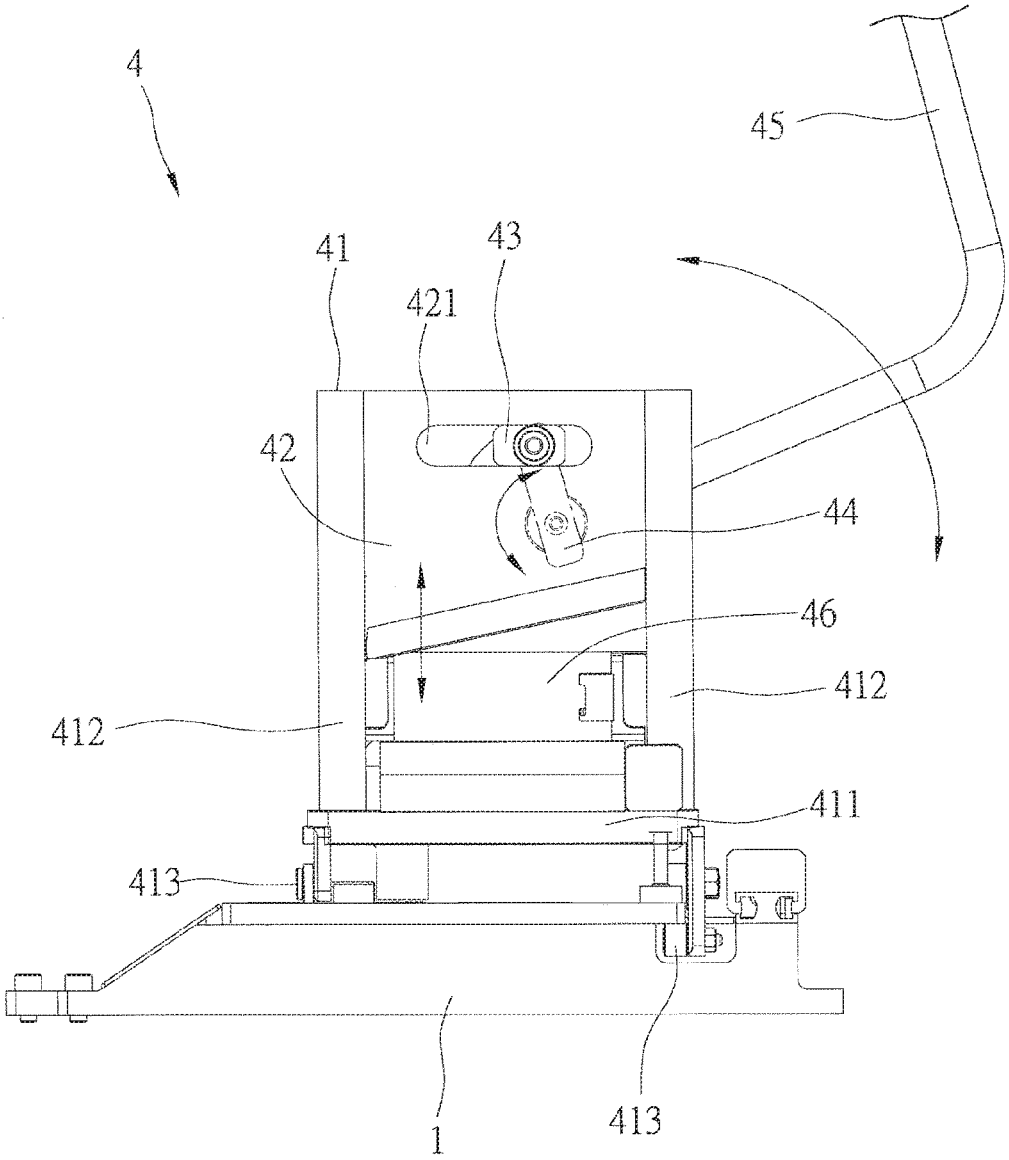
FIG. 7 and FIG. 8 are right views of the second cutting unit of the preferred embodiment of the present invention, showing the cutter moving along the rail.
Figure 8:
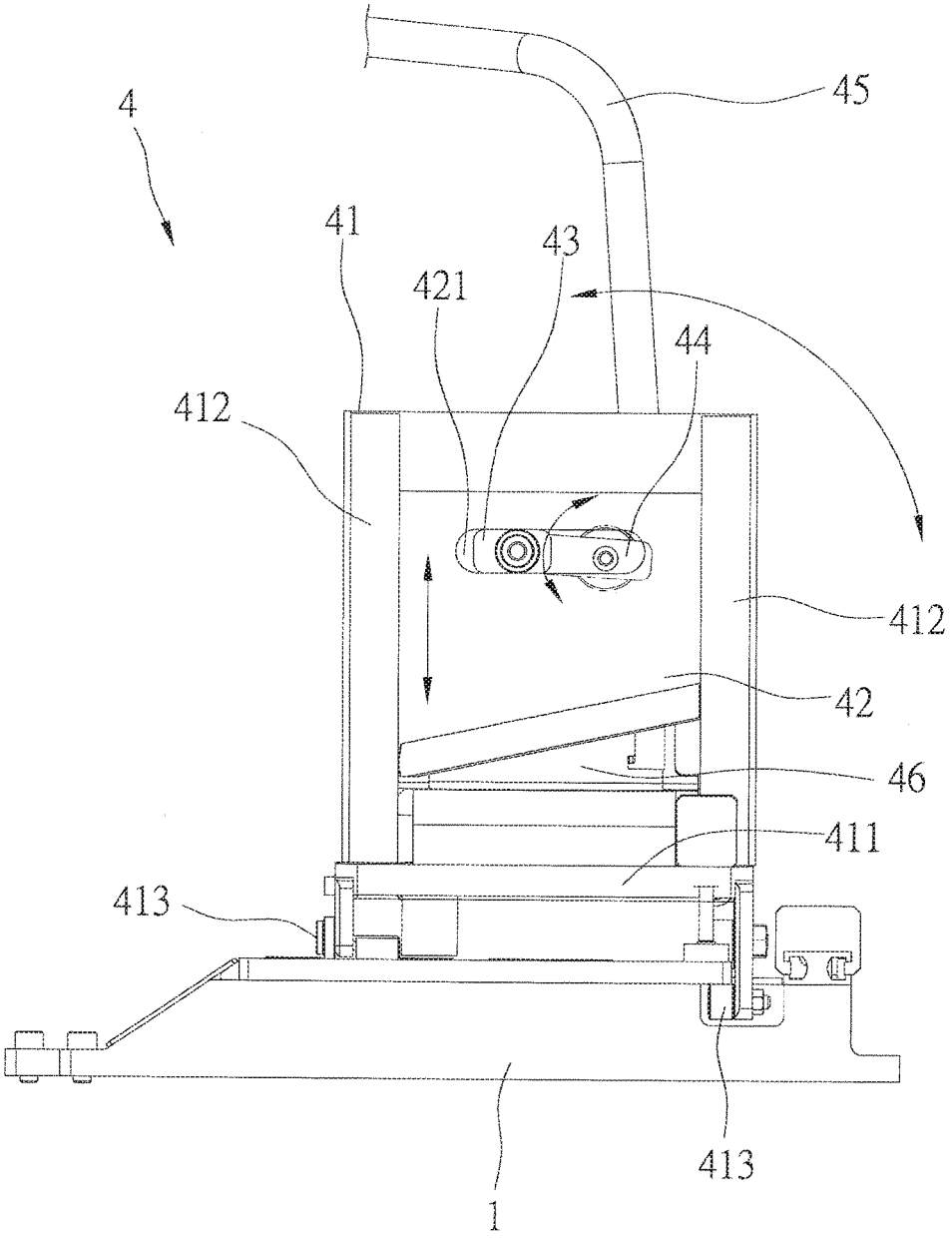
Figure 9:
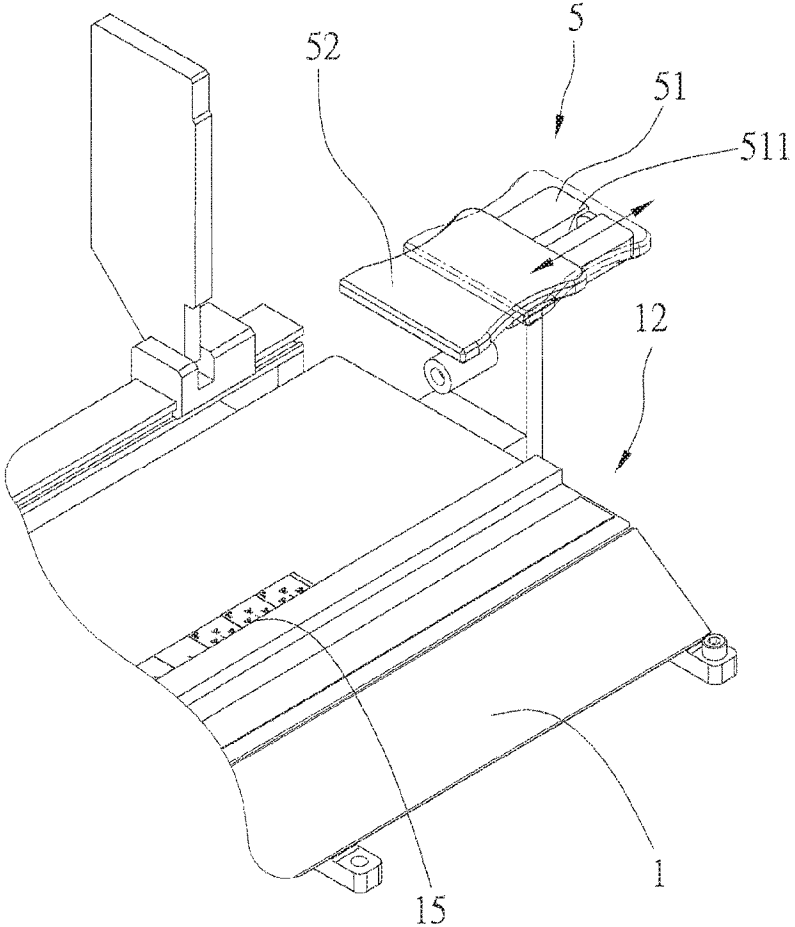
FIG. 9 is a perspective view of the second restricting unit of the preferred embodiment of the present invention.

As shown in FIG. 7 to FIG. 9, the second cutting unit 4 and the second restricting unit 5 are provided to precisely cut the vertical slats of the vertical blinds. The second cutting unit 4 has a frame 41, a cutter 42, and a controller. The frame 41 is provided on the machine base 1, which has a movable base 411 and two rails 412. The movable base 411 has two wheels sets 413, and therefore the movable base 411 may freely reciprocate along the long axis of the machine base 1. The rails 412 are mounted on the movable base 411 at a side opposite to the wheel sets 413. The rails 412 are parallel with each other, and they are set parallel to the short axis of the machine base 1. The cutter 42 is provided in the frame 41. The cutter 42 is set between the rails 412 and engages the rails 412 with both sides, so that the cutter 42 is able to move vertically. A second bore 46 is formed between the cutter 42 and the rails 412 to receive the slats. The cutter 42 has a slot 421 parallel to the short axis of the machine base 1. The controller is connected to the cutter 42 to move the cutter 42. In an embodiment, the controller has a sliding block 43, a linkage 44, and a control bar 45. The sliding block 43 is received in the slot 421 of the cutter 42 and moves along the slot 421. The linkage 44 has opposite ends pivoted respectively on the sliding block 43 and the control bar 45, and the control bar 45 is further pivoted on the frame 41 to form a four-linkage mechanism. When a user operates the control bar 45, it will move the cutter 42 up and down via the four-linkage mechanism.

The second restricting unit 5 has a fixing base 51 and a restricting board 52. The fixing base 51 is provided to the second side 12 of the machine base 1. The fixing base 51 has a slot 511 along the long axis of the machine base 1. The restricting board 52 is provided on the fixing base 51 and engages the slot 511, therefore the restricting board 52 is able to move along the long axis of the machine base 1.

While operating, a user moves the second cutting unit 4 to a specified position according to the first scale 15, and then puts the vertical slats in the second bore 46 and lets the vertical slats touch the restricting board 52 of the second restricting unit 5. After securing the vertical slats, the user moves the restricting board 52 in a direction away from the second cutting unit 4 to separate the restricting board 52 from the vertical slats, and then operates the control bar 45 to let the cutter 42 cut the slats.

As a result, the vertical slats are precisely cut with the help of the restricting board 52. If another vertical slats have to be cut for the same size, it doesn't need to move the second cutting unit 4. Furthermore, moving the restricting board 52 in a direction away from the second cutting unit 4 before cutting is helpful to a fine cut of the slats. The waste materials of cutting are left between the second cutting unit 4 and the second restricting unit 5. The user may remove the waste material easily because of moving away of the restricting board 52 before cutting.

The cutting machine of the present invention may cut the components of blinds in an easy way. It may cut different components by different cutters at the same time. The description above is only a few preferred embodiments of the present invention and the equivalence of the present invention is still in the scope of claim construction of the present invention.

What is claimed is:

1. A cutting machine for cutting components of window coverings, wherein the components of the window coverings include a horizontal top rail, a horizontal bottom rail and horizontal slats of a venetian blind, and a vertical top rail and vertical slats of a vertical blind, the cutting machine comprising:

a machine base for the components, which is a substantially elongated member, which has a long axis and a short axis, wherein the machine base has a first side and a second side parallel to the short axis, and has a third side and a fourth side parallel to the long axis;

a first cutting unit, which is provided on the machine base and adjacent to the first side, including a base, a slat holding device, a cutter device, and a driving device;

the base having a first bore and a first positioning bore to receive the horizontal slats and the horizontal top rail respectively;

the slat holding device having a pressing block and a pushing member, wherein the pressing block is movably received in the first bore of the base and has a bore to receive the horizontal bottom rail;

the pushing member moves the pressing block toward the first positioning bore;

the cutter device, which is movably provided on the base, having a first cutter and a second cutter which are adjacent to the first bore and the first positioning bore respectively, and the first cutter is used to cut off the horizontal slats and the horizontal bottom rail, the second cutter is used to cut off the horizontal top rail; and the driving device having a connecting member and an operating member, wherein the connecting member is connected to the cutter device, and the operating member is connected to the connecting member to move the cutter device; *and* a second cutting unit, which is movably mounted on the machine base, comprising a frame, a cutter, and a controller;

the frame, which *is* movably provided on the machine base for a movement along the long axis of the machine base;

the cutter, which is movably provided in the frame, wherein a second bore is formed between the cutter and the frame to receive the vertical slats; and the controller, which is connected to the cutter to move the cutter;

wherein the frame has a movable base and two rails; the movable base is movably mounted on the machine base, and the rails are connected to the movable base; the rails are vertical to the movable base and are parallel to the short axis of the machine base; the cutter is provided between the rails with opposite sides engaging the rails; and the controller moves the cutter to move in the rail to cut the vertical slats.

2. The cutting machine as defined in claim 1, wherein the pushing member of the slat holding device of the first cutting unit has a block, a shaft, and a flexible member; the block is connected to the connecting member; the block has an opening, and the base has an opening; the shaft is received in the opening of the block and passes through the opening of the base to connect to the pressing block; the flexible member is provided on the shaft and is between the block and the base to move the pressing block.

3. The cutting machine as defined in claim 2, wherein the shaft has a protrusion at a side adjacent to the pressing block; the protrusion is outside of the base; and the flexible member is between the protrusion and the block.

4. The cutting machine as defined in claim 1, wherein the cutter is provided with a slot parallel to the short axis of the machine base; and the controller includes a sliding block, a linkage, and a control bar; the sliding block is received in the slot of the cutter to move in the slot; the linkage is pivoted on the sliding block; and the control bar is pivoted on the frame and engages the linkage, whereby when the control bar is moved, the cutter is moved via the linkage and the sliding block.

5. The cutting machine as defined in claim 1, further comprising a second restricting unit which has a fixing base and a restricting board; the fixing base is connected to the second side of the machine base, and the restricting board is movably provided on the fixing base to move along the long axis of the machine base.

6. The cutting machine as defined in claim 1, further comprising a first restricting unit provided on the machine base, wherein the first restricting unit is closer to the first side than the first cutting unit; the first restricting unit has a stop device, a transmitting device, and a fixing device; the stop device is beside the first cutting unit; the transmitting device is connected to the stop device and the driving device; when the driving device moves the cutter device along the short axis of the machine base, the driving device moves the stop device between a first position and a second position, wherein the first position is closer to the cutter device than the second position; at the first position, the stop device rests against ends of the horizontal bottom rail and the horizontal slats in the first bore and the horizontal top rail in the first positioning bore; the fixing device is connected to the machine base; the transmitting device rests against the fixing device when the stop device is at the first position, and the transmitting device leaves the fixing device when the stop device moves toward the second position from the first position.

7. The cutting machine as defined in claim 6, wherein the transmitting device has a transmitting board, a transmitting shaft, a first supporting shaft, a second supporting shaft, and a locking member; the transmitting board is pivoted on the machine base through an axle; the transmitting board has a slot; the transmitting shaft has an end connected to the connecting member of the driving device to move with the cutter device; the transmitting shaft has a post on an opposite end to engage the slot of the transmitting board; the first supporting shaft has an end fixed to the machine base and an opposite end engaging the stop device, whereby the stop device is free to move between the first position and the second position relative to the first supporting shaft; the second supporting shaft has an end passing through the base and an opposite end pivoted on the transmitting board; the locking member is connected to the second supporting shaft; the locking member is provided with a scale to secure the stop device at a specific position; when the driving device moves the cutter device and the transmitting shaft, the post moves in the slot to swing the transmitting board and move the second supporting shaft in a direction away from the base, as a result, the stop device is moved in a direction away from the first bore and the first positioning bore.

8. The cutting machine as defined in claim 7, wherein the transmitting board of the transmitting device is closer to the first cutting unit than the fixing device of the first restricting member to be moved to rest against or leave the fixing device.

9. The cutting machine as defined in claim 1, wherein the connecting member of the driving device is a rack; the rack has teeth meshed with a gear set; and the gear set is connected to the operating member.

10. The cutting machine as defined in claim 1, wherein the base is further provided with a second positioning bore adjacent to the first positioning bore to receive the vertical top rail; the first bore, the first positioning bore and the second positioning bore are located in order along the short axis of the machine base; the cutter device further has a third cutter beside the second positioning bore to cut the vertical top rail.

*11. A cutting device for cutting window coverings, comprising:*

*a machine base, which is a substantially elongated member;*

*a frame, which one end of a window covering to be cut is passed through, the frame being positioned on the machine base;*

*a cutting unit, positioned corresponding to the frame, having at least one cutter device;*

*a driving device, connected to the cutting unit, the driving device being controlled to move the cutting unit with respect to the frame and to cut the window covering with the at least one cutter device; and*

*a positioning device, positioned on the machine base and adjacent to the frame, the positioning device comprising:*

*a stop device, which is movably positioned on the machine base, the stop device being moved by the driving device from a first position to a second position, wherein, the first position is closer to the frame than the second position, and when the stop device is at the first position, the one end of the window covering passed through the frame abuts against the stop device; and*

*a transmitting device, connected to the stop device and the driving device, the transmitting device being driven by the driving device; wherein, the driving device drives the cutting unit and the transmitting device simultaneously such that when the at least one cutter device of the cutting unit is driven to cut the window covering by the driving device, the transmitting device moves the stop device from the first position to the second position so as to separate the stop device from the one end of the window covering.*

*12. The cutting device for cutting window coverings of claim 11, wherein the transmitting device comprises:*

*a transmitting board having a slot, wherein the transmitting board is pivoted on the machine base through an axle, and is controllable to pivot on the machine base along the axle;*

*a transmitting shaft, wherein one end of the transmitting shaft is connected to the driving device, and the other end of the transmitting shaft includes a post engaged in the slot of the transmitting board, wherein the transmitting shaft is controllable to move with the cutting unit synchronously by the driving device; and*

*a supporting unit, fixed on the machine base, wherein the stop device is movably disposed on the supporting unit and is driven to move from the first position to the second position along the supporting unit.*

*13. The cutting device for cutting window coverings of claim 12, wherein the supporting unit comprises a first supporting shaft having one end fixed on the machine base, and an opposite end passing through the stop device, whereby the stop device is controllable to move along the first supporting shaft.*

*14. The cutting device for cutting window coverings of claim 13, wherein the supporting unit further comprises a second supporting shaft having one end passing through the frame, and an opposite end pivoted on a side of the transmitting board opposite to the post of the transmitting shaft; the second supporting shaft is controllable to move with respect to the frame together with the movement of the transmitting shaft driven by the driving device.*

*15. The cutting device for cutting window coverings of claim 14, wherein the transmitting device further comprises a locking member connected to the second supporting shaft and the stop device; the locking member fixes the stop device at a predetermined position on the second supporting shaft;*

*when the driving device moves the cutting unit and the transmitting shaft, the post of the transmitting shaft slides along the slot of the transmitting board so as to move the second supporting shaft in a direction away from the frame and to move the stop device from the first position to the second position along the first supporting shaft.*

*16. The cutting device for cutting window coverings of claim 15, wherein the locking member comprises a scale positioned along a longitudinal direction of the second supporting shaft; the locking member fixes the stop device on the predetermined position according to the scale, and the predetermined position of the second supporting shaft is corresponding to the first position of the stop unit before the driving device moving the cutting unit.*

*17. The cutting device for cutting window coverings of claim 12, further comprising a fixing device, the fixing device being positioned on the machine base and adjacent to a side of the transmitting board opposite to the frame, wherein the transmitting board abuts against the fixing device when the stop device is at the first position; the transmitting board moves away from the fixing device when the stop device moves from the first position to the second position.*

*18. The cutting device for cutting window coverings of claim 11, wherein the frame comprises a first bore and a first positioning bore for receiving slats and a rail of the window covering respectively.*

*19. The cutting device for cutting window coverings of claim 18, further comprising a slat holding device having a pressing block and a pushing member, wherein the pressing block is movably positioned in the first bore of the frame, and the pushing member is controllable to move the pressing block toward the slats of the window covering received in the first bore of the frame.*

*20. The cutting device for cutting window coverings of claim 19, wherein the pressing block comprises a bore for receiving another rail of the window covering.*

* * * * *